(12) United States Patent
Elsner (10) Patent No.: US 7,686,159 B2
(45) Date of Patent: Mar. 30, 2010

(54) EXCHANGEABLE ATTACHMENT AND ATTACHMENT HOLDER FOR MODULAR BELTS

(75) Inventor: Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/985,407

(22) Filed: Nov. 15, 2007

(65) Prior Publication Data
US 2009/0127075 A1 May 21, 2009

(51) Int. Cl.
*B65G 17/06* (2006.01)
(52) U.S. Cl. ............... 198/853; 198/867.15; 198/699.1
(58) Field of Classification Search ......... 198/850, 198/851, 852, 853, 699.1, 867.15, 867.01
See application file for complete search history.

(56) References Cited

U.S. PATENT DOCUMENTS

| 4,832,183 | A | 5/1989 | Lapeyre |
| 4,925,013 | A | 5/1990 | Lapeyre |
| 5,000,311 | A | 3/1991 | Abbestam et al. |
| 5,725,084 | A | 3/1998 | Jager |
| 6,321,904 | B1 | 11/2001 | Mitchell |
| 6,332,531 | B1 | 12/2001 | Damkjaer |
| 6,382,021 | B1 * | 5/2002 | Lawrence ............... 73/170.01 |
| 6,467,610 | B1 | 10/2002 | MacLachlan |
| 6,554,129 | B2 * | 4/2003 | Straight et al. ............ 198/853 |
| 6,695,135 | B1 | 2/2004 | Lapeyre |
| 6,811,021 | B1 * | 11/2004 | Corley .................... 198/853 |
| 6,827,204 | B2 | 12/2004 | Cribiu |

* cited by examiner

*Primary Examiner*—James R Bidwell
(74) *Attorney, Agent, or Firm*—Hodgson Russ LLP (57) ABSTRACT

A belt module suitable for use in a modular belt and designed for holding attachments such as flights. The belt module has an attachment holder with a dovetail section on the upper surface that accommodates attachments and the like that are designed to be removably attached to the holder by means of attachments furnished with foot extensions that fit into the dovetail section by sliding the foot laterally into a locked position relative to the attachment holder.

19 Claims, 10 Drawing Sheets

ABLE ATTACHMENT AND
ATTACHMENT HOLDER FOR MODULAR
BELTS

FIELD OF THE INVENTION

This invention relates to conveyor belts and, more particularly, to modular plastic conveyor belts formed of rows of plastic belt modules pivotally interlinked by transverse pivot rods.

BACKGROUND OF THE INVENTION

Figure 1A:
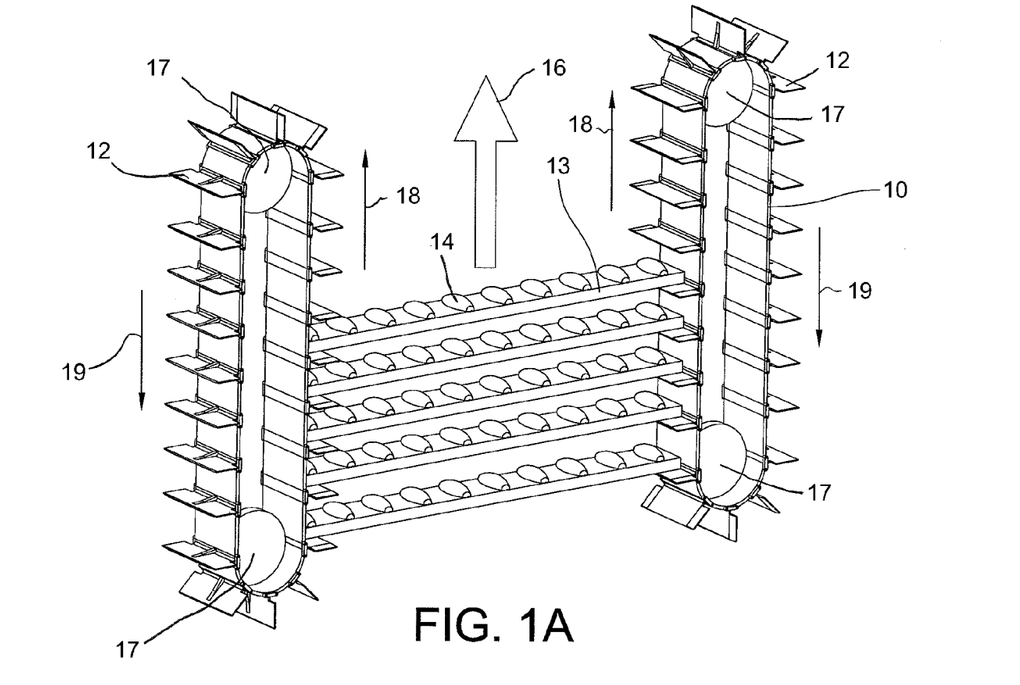
FIG. 1A is a schematic diagram of a vertical conveyor.
Figure 1B:
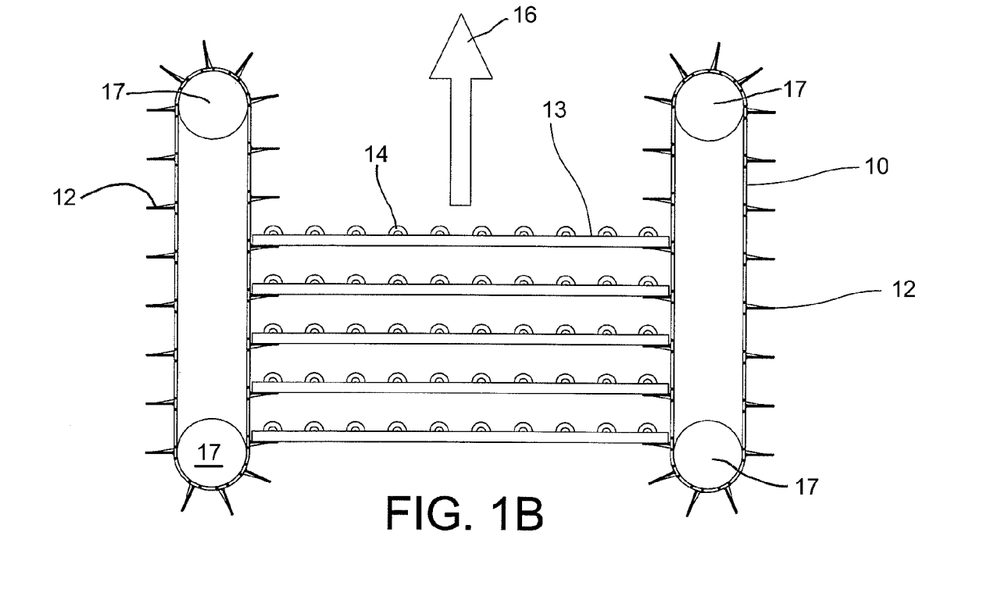
FIG. 1B is a front elevational view of the conveyor of FIG. 1A.

Modular belts may be furnished with accessories such as flights that may be produced integrally on special flight modules that are connected to standard modules. The flight modules may be connected in rows of single modules as part of a chain or the flight modules may be connected to adjacent rows of modules in a bricklayed fashion. In order to provide greater flexibility for using various types of attachments on the same belt type or for easier repair, it is known to provide specially designed modules with removable accessories. An example of this type of module is shown in U.S. Pat. No. 4,832,183. This design includes a recess within the intermediate section between the links of the belt module such that an accessory (i.e., flight) can be shifted into locking position from the side of the module. Installation or removal of the attachments disclosed in the '183 patent requires space on the side of the belt. This space has to be as wide as the flight itself. If the free side movement is obstructed or belts are running side-by-side, the space for side clearance is not available and installation or removal of the accessory is only possible after the belt has been uninstalled. Such typical applications include vertical pan conveyors in bakeries as schematically shown in FIGS. 1A and 1B. Special belts 10 having a plurality of flights 12 are running side-by-side to carry pans 13 and to move them vertically in the direction of arrow 16. The pans 13 are used to convey baked goods 14. FIGS. 1A and 1B show one pair of belts 10 only. The belts 10 articulate about sprockets 17 in the direction of arrows 18, 19. In the actual application a series of belts are running side-by-side in such a way that a series of pans, which move with the belts from bottom to top, are carried in a large enclosure.

U.S. Pat. No. 6,554,129 discloses snapped on flights, but the system is not safe enough in all applications because it may disengage at high load. For vertical pan conveyors in bakeries as discussed previously, special requirements have to be fulfilled. The loads are usually quite high and the attachments need to be well secured to the belt. In this application, the pans may become jammed and the attachments may be damaged and need to be replaced. Also, the accessory or belt may break completely. In such a case it is desirable to assure that only the removable attachment is damaged and not the belt.

Accordingly, there is a need for removable attachments that allow for secure attachment in a flexible manner. The system should provide for positive fixation of the attachment allowing high loads without risk of disengagement. The system should not require significant side clearance. Also, the system should provide optional disengagement on breakage of the attachment at a calculated limit to protect the belt from damage due to overload.

SUMMARY OF THE INVENTION

The present invention meets the above-described need by providing a module for holding an attachment. The module has an intermediate portion with an upper surface having at least one pair of opposed dovetail sections extending above the upper surface. The dovetail sections are disposed in spaced-apart relation from the side edge of the module. The module has a first plurality of link ends that extend outward from the intermediate portion. The first plurality of link ends have transverse openings defined therein. A second plurality of link ends extend outwardly from the intermediate portion in a direction opposite to the first plurality of link ends. The second plurality of link ends are offset from the first plurality of link ends such that the first plurality of link ends are capable of intercalating with the second plurality of link ends of an adjacent module. The second plurality of link ends also have transverse pivot rod openings defined therein. When the first and second link ends of adjacent modules are intercalated, a transverse pivot rod can be inserted to pivotally connect adjacent rows of modules to form an endless belt capable of articulating about a sprocket.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 2A:
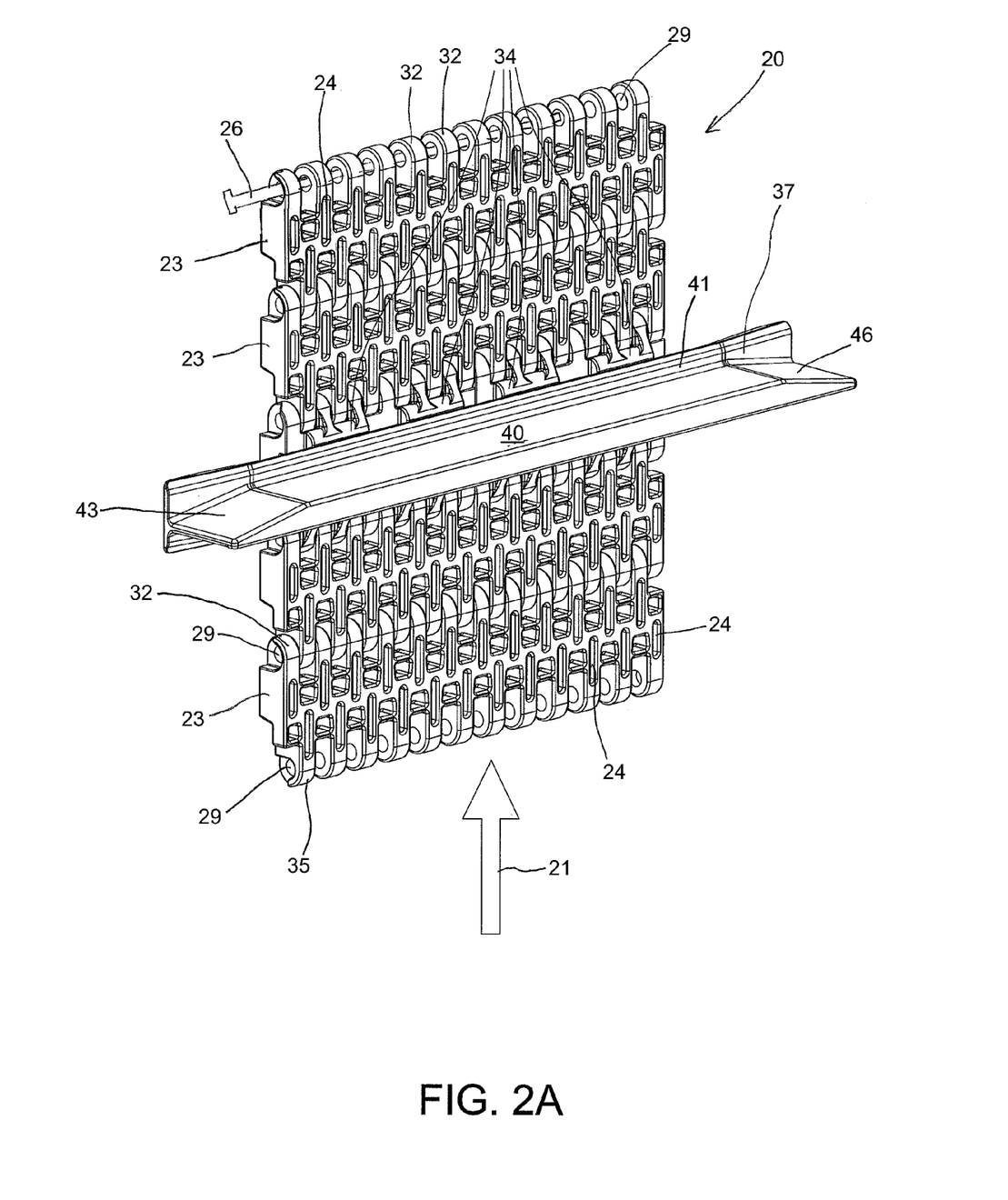
FIG. 2A is perspective view of a belt with a flight attachment according to the present invention.

In FIG. 2A, a modular belt 20 has a plurality of belt modules 23 that are pivotally connected by a pivot rod 26 through aligned transverse pivot rod openings 29 as will be evident to those of ordinary skill in the art based on this disclosure. The belt 20 may be used for a vertical pan conveyor moving in the direction of arrow 21. The belt modules 23 are flush grid type with openings 24 disposed from the top surface through to the bottom surface. The present invention may also be utilized with other types of modules including, but not limited to, closed, flat top modules. Each of the modules 23 has a first plurality of link ends 32 extending from one side and a second plurality of link ends 35 extending from the opposite side.

Figure 2B:
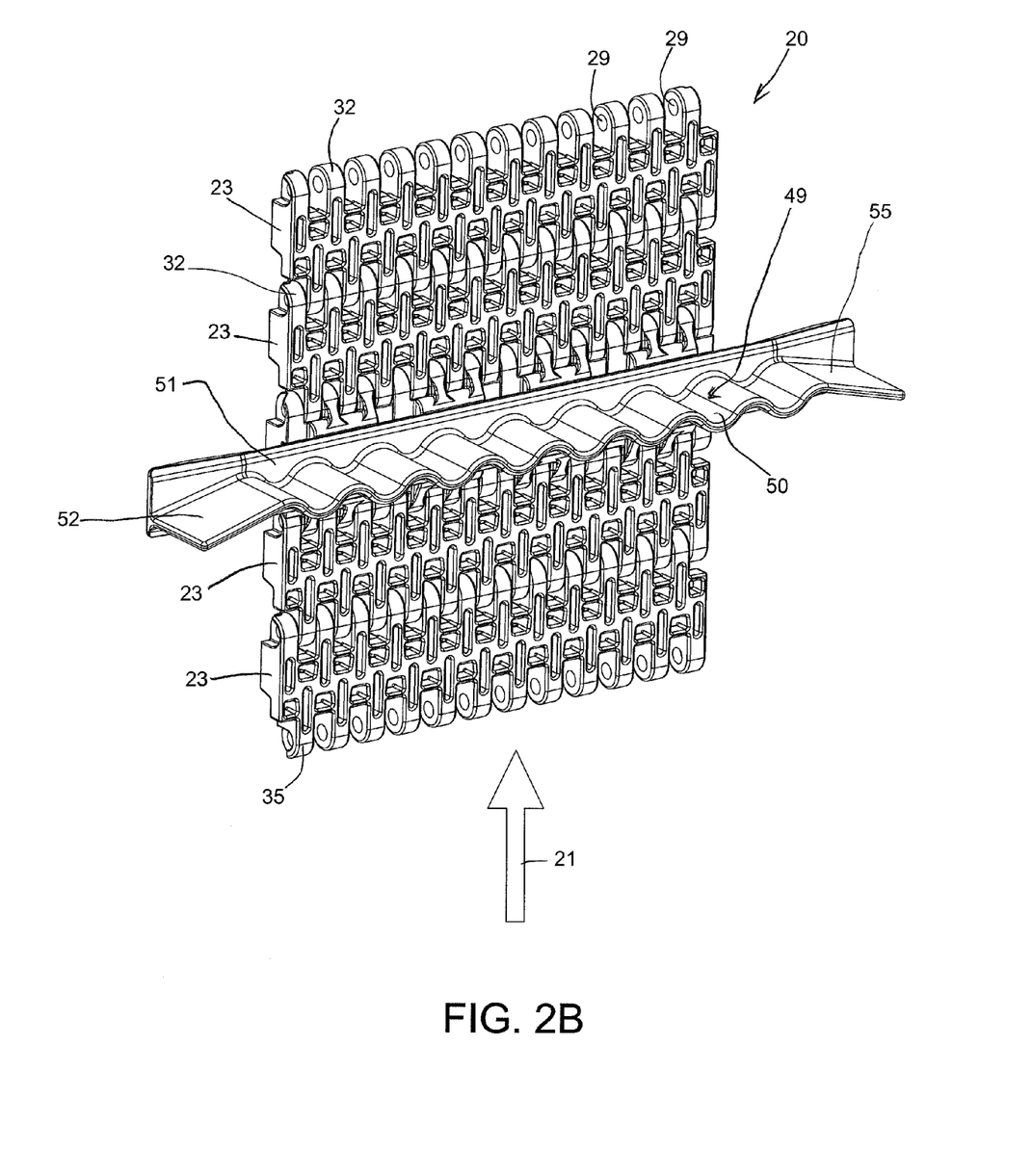
FIG. 2B is a perspective view of the belt of FIG. 2A with an alternate embodiment of the flight attachment.

The belt 20 is provided with a specially designed module 30 (FIGS. 3A, 3B) having an attachment holder 100 for fixing an attachment such as a flight 37 to the belt 20. The attachment may be produced from rigid plastic materials such as polypropylene, polyethylene, polyacetal, polyamide or the like. Also, the attachment may be produced from elastic materials such as a thermoplastic rubber-like material or the like. As shown in FIG. 2A, the flight 37 has a straight upstanding wall 40 extending from a base portion 41. The flight 37 may include tapered end portions 43 and 46. As an alternative shown in FIG. 2B, a flight 49 having a wall 50 may also be used. The wall 50 extends from a base portion 51. The wall 50 is corrugated in shape, and may also include a pair of tapered sections 52, 55. The corrugated flight 49 may provide some advantages for a strong and stiff design that is easily cleanable and easy to mold because of the constant wall thickness. Other types of attachments such as buckets, bent flights, elastic flights, perforated flights, or the like are also possible.

Figure 3A:
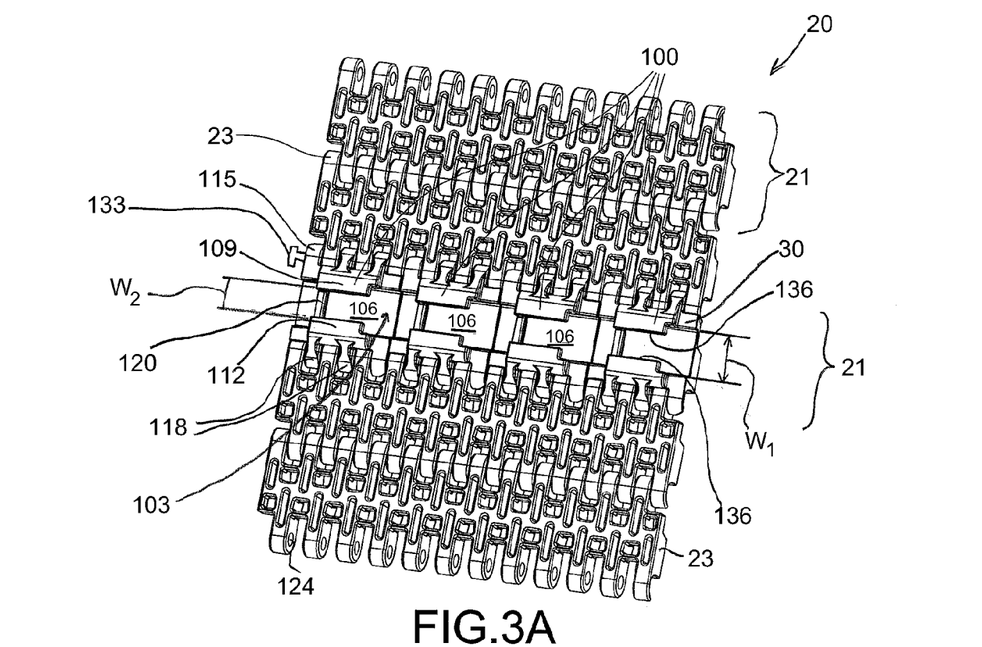
FIG. 3A is a perspective view of the belt of the present invention with the attachment removed to illustrate individual belt modules having one attachment holder per module.

Turning to FIG. 3A, belt 20 includes modules 30 with attachment holders 100. As shown there are four modules 30 with attachment holders 100 inserted within a row 21 of belt modules. Each attachment holder 100 has a midportion 103 with surface 106 for supporting the flights. A pair of dovetail sections 109, 112 are disposed opposite from each other and in spaced apart relation from the surface 106. The modules 30 have spaced apart link ends 115, 118 extending from opposite sides in the direction of belt travel for intercalating with the link ends 32 and 35 of the adjacent modules 23. The link ends 115, 118 have transverse openings 121 (FIG. 4A) that align with the transverse openings 124 in the intercalated link ends 32, 35. With the transverse openings 121, 124 aligned, the modules 30 are connected to the adjacent modules 23 by inserting a transverse pivot rod 133 as will be evident to those of ordinary skill in the art based on this disclosure. As shown in FIG. 3A, the surface 106 has a width $W_1$ that is visible on the right hand side of the modules 30 in the figure. Towards the middle of the modules 30, the dovetail sections 109, 112 have end walls 136 that form a narrower opening $W_2$ exposing a portion of the surface 106. A rib 120 is disposed on the surface 106 toward the left hand side of the attachment holder 100. The rib 120 provides a structure for retention of the flight attachment as described in greater detail below. Additional structure of the holder 100 and details of the engagement with the flight attachment are described in greater detail below.

Figure 3B:
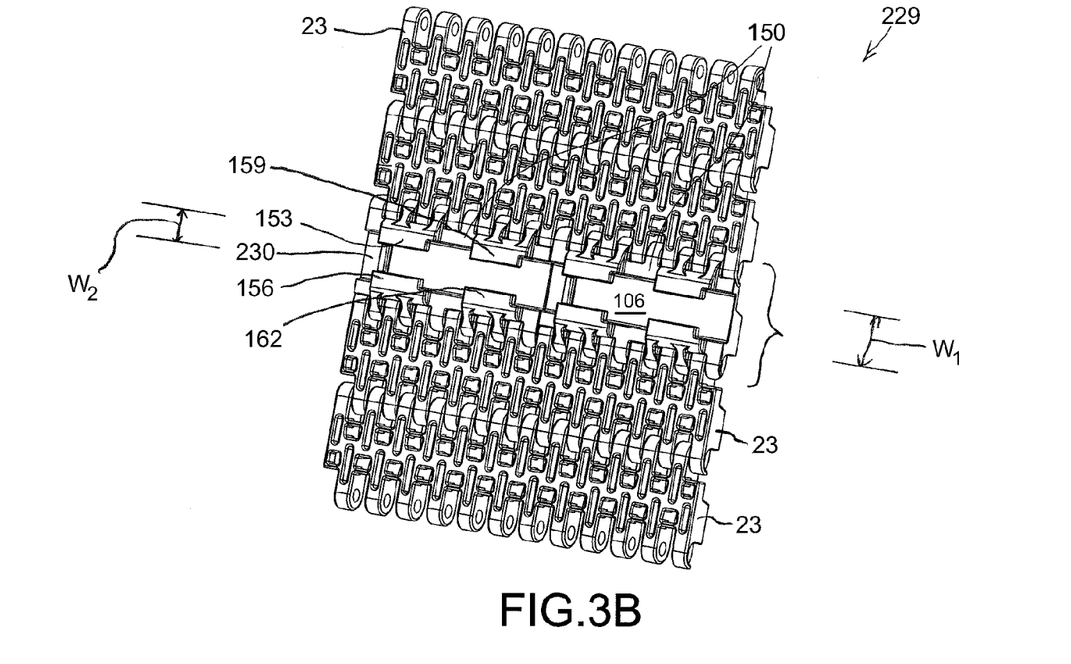
FIG. 3B is a perspective view of an alternate embodiment with two attachment holders per module.

In FIG. 3B, an alternate embodiment of the module 30 with holders 100 is shown. Module 230 includes attachment holder 150 which may include four dovetail sections 153, 156, 159, and 162. The belt 20 is shown with two modules 230 with attachment holders 150 comprising one row 21 of belt 229.

Figure 4A:
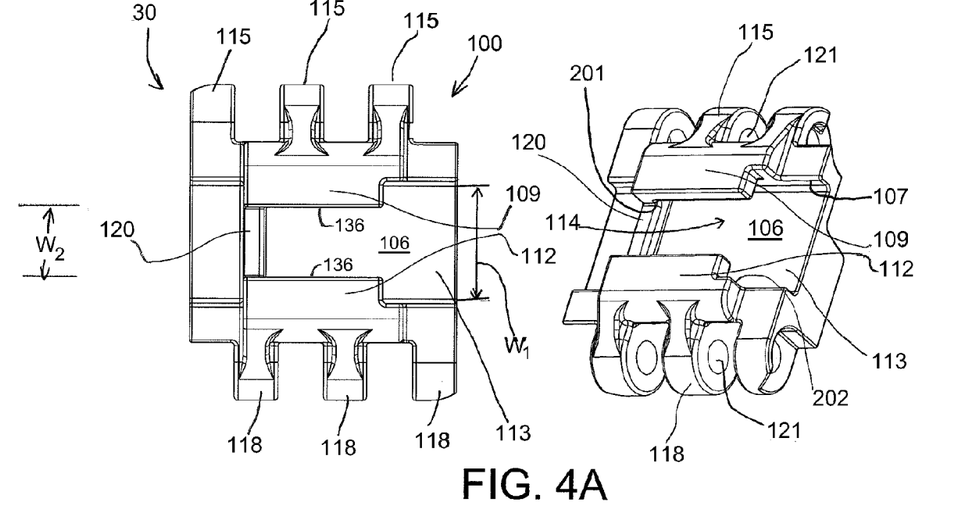
FIG. 4A is an enlarged perspective view of a module having a single attachment holder.

Referring to FIG. 4A, module 30 with attachment holder 100 is shown in greater detail. The dovetail sections 109, 112 extend above and substantially parallel to surface 106 of the module 30. The dovetail sections 109, 112 form a slot having a width $W_2$ that is smaller than the width $W_1$ of the mid portion 113 of the module 30. The midportion 113 may be recessed to form a groove 114 bordered by surface 106 and side walls 107. The surface 106 and the dovetail sections 109, 112 form a T-shaped opening that extends to the rib 120 and to the end walls 201, 202 extending underneath the dovetail sections 109, 112.

Figure 4B:
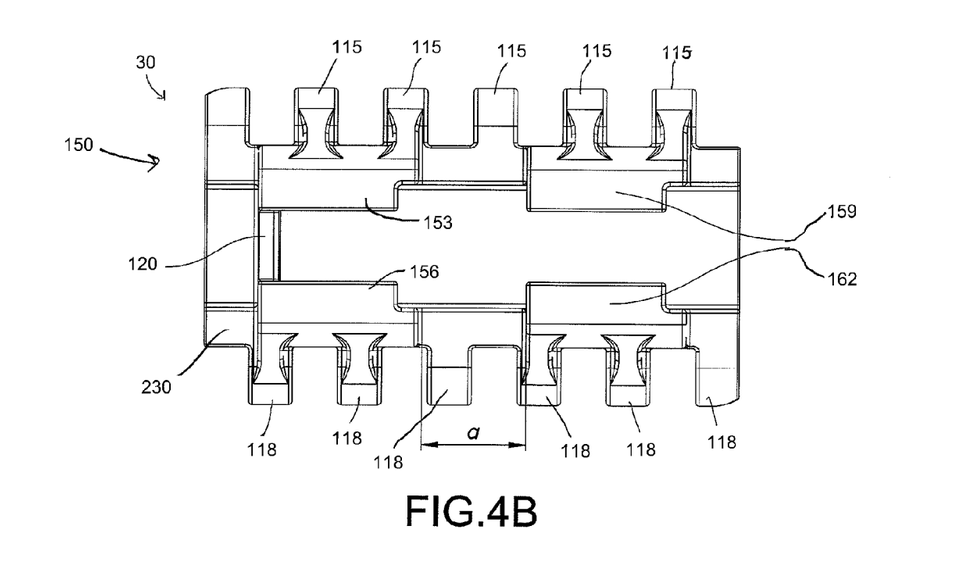
FIG. 4B is an enlarged plan view of a module having two attachment holders disposed thereon.

In FIG. 4B, module 230 with attachment holder 150 is shown. The dovetail sections 153, 156 are separated from dovetail sections 159, 162 by a distance a. The space a between the dovetail sections may be provided by adjacent modules 30 as shown in FIG. 4A or it may be provided integrally within a single module 230 as shown in FIG. 4B. In either arrangement the opening a provides space for installing the attachments as will be described in greater detail herein.

Figure 5A:
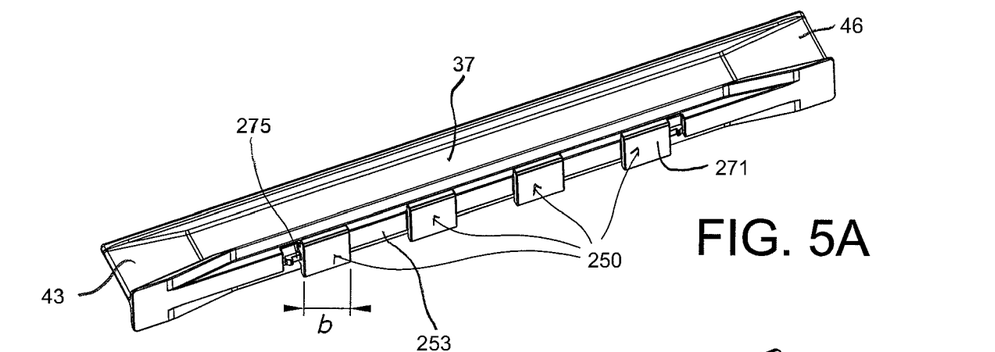
FIG. 5A is a perspective view of a flight attachment of the present invention.
Figure 5B:
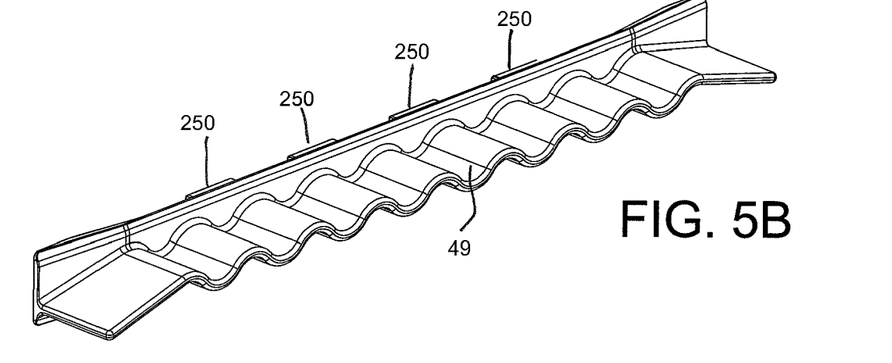
FIG. 5B is a perspective view of an alternate embodiment of the flight attachment.
Figure 5C:
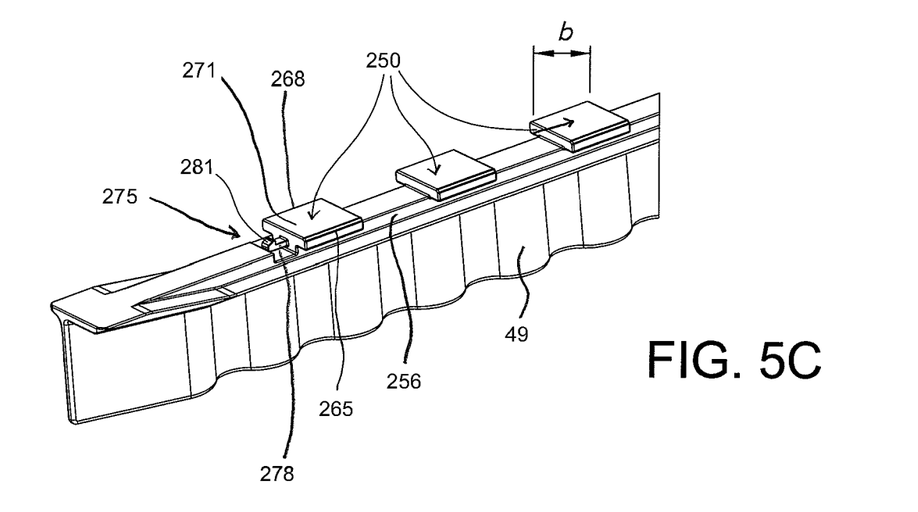
FIG. 5C is an enlarged perspective view of a portion of the attachment of the present invention.

Turning to FIGS. 5A-5C, flight 37 is provided with feet 250 that extend from the bottom surface 253 of the flight 37. The feet 250 (as shown in FIG. 5C in connection with corrugated flight 49) may be attached to a rail-shaped portion 256 at the bottom of the flight. The feet 250 have a width b and are wider than the rail-shaped portion 256. The feet 250 have a square or rectangular shape with side walls 265, 268. The bottom surface 271 of the foot 250 extends substantially parallel to the bottom surface 253 of the flight 49. At the front of one of the feet 250, there is a locking member 275. The locking member 275 has a cantilevered section 278 extending to a distally positioned latch portion 281. The cantilevered portion 278 is capable of deflecting so that the latch portion 281 may pass over the rib 120 and then snap down beyond it to lock the attachment into position in the attachment holder.

Figure 6A:
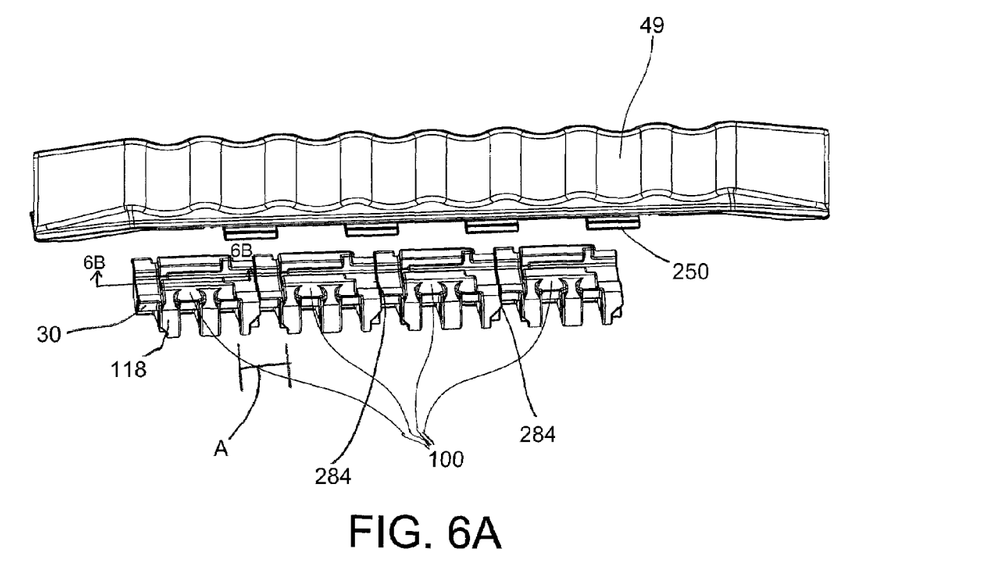
FIG. 6A is a perspective view showing engagement of the attachment with the attachment holders.
Figure 6B:
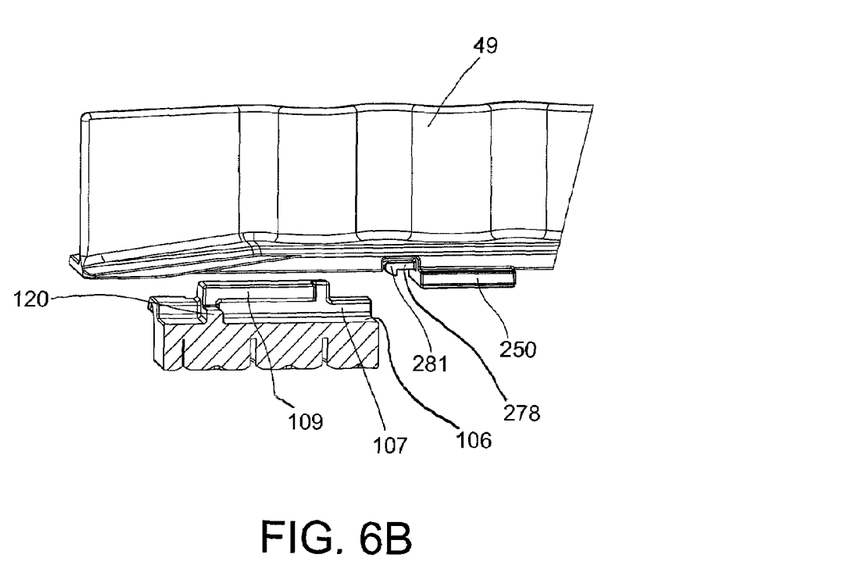
FIG. 6B is an enlarged perspective view showing a portion of the attachment in relation to an attachment holder.

Turning to FIGS. 6A and 6B, the installation of an attachment is shown. In FIG. 6A, four modules 30 with attachment holders 100 are aligned in a single row with link ends 118 disposed in transverse alignment for pivotal connection with adjacent modules. The modules 30 are disposed adjacent to one another along an end wall 284. The arrangement creates a gap A for receiving the foot 250. As shown in FIG. 6B, a slot for receiving foot 250 is created by surface 106 of module 30, side wall 107, and dovetail section 109. The slot is bordered at the end by rib 120 as shown. The other side of the attachment holder 100 is identically formed with dovetail section 112, the opposite sidewall 107, and surface 106.

Figure 6C:
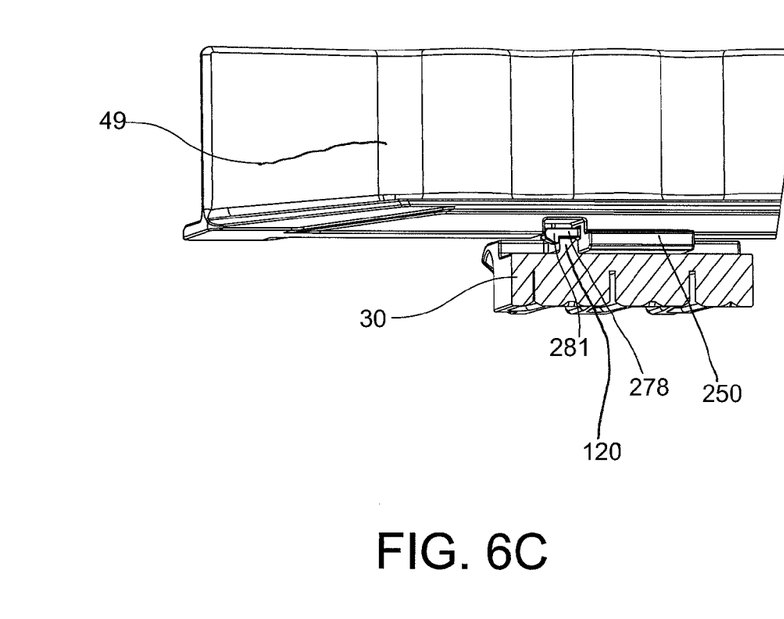
FIG. 6C is a perspective view of a portion of the attachment showing the flight attachment engaged with an attachment holder of the present invention.

Turning to FIG. 6C, the attachment is installed by sliding the foot 250 in the slot described above until the latch portion 281 slides over the rib 120 (in the direction from right to left with respect to the orientation of the figure) and locks into the position shown such that the attachment cannot be slid in the reverse direction in the slot without releasing the latch portion 281 from the rib 120.

Figure 6D:
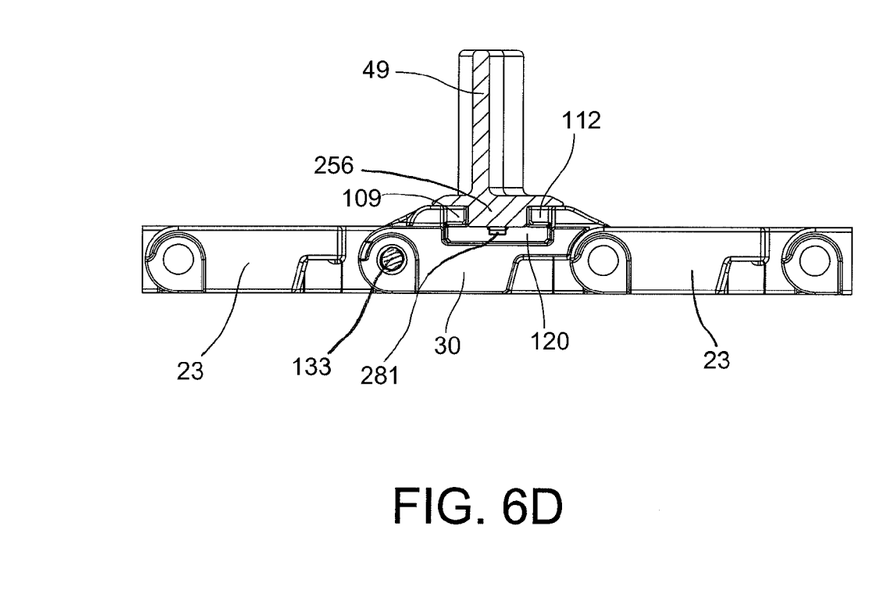
FIG. 6D is an end view of the flight attachment engaged with the attachment holder.

In FIG. 6D, the latch portion 281 is engaged with the rib portion 120. The module 30 is connected to the adjacent module 23 by means of a transverse pivot rod 133 disposed in the aligned transverse pivot rod openings 121, 124. The rail portion 256 extends between the dovetail sections 109, 112 and the foot 250 fits in the spaces created underneath the dovetail sections 109, 112. The foot portion 250 is blocked by the rib 120 in FIG. 6D and therefore not visible.

Figure 7A:
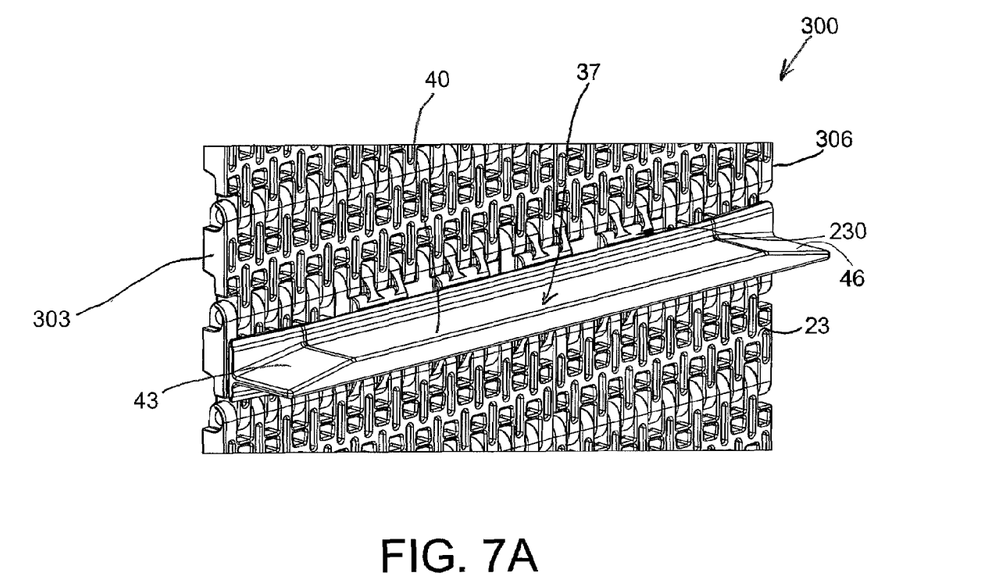
FIG. 7A is a perspective view of a belt with a flight attachment affixed thereto according to the present invention.
Figure 7B:
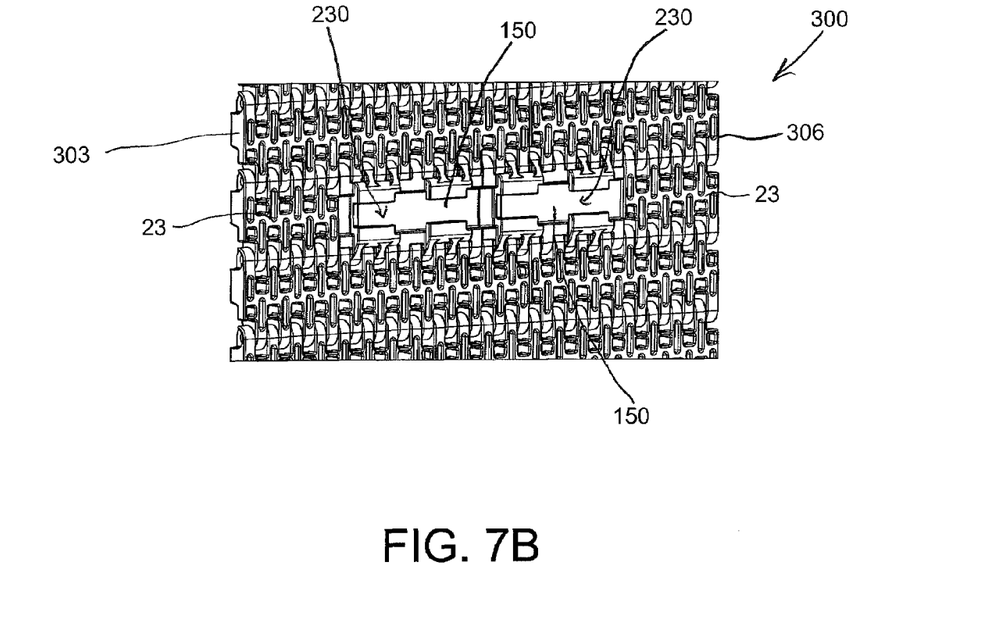
FIG. 7B is a perspective view of the belt of FIG. 7A with the flight attachment removed.

Turning to FIGS. 7A and 7B, a belt 300 according to the present invention includes standard modules 23 which are shown as flush grid modules. The attachment is a flight 37 with upstanding wall 40 extending to tapered end portions 43 and 46. The flight 37 extends from a first side edge 303 of the belt 300 to the opposite side edge 306. However, the belt 300 has standard modules 23 at the sides near the edges 303, 306. In FIG. 7B, the belt 300 is shown with the flight 37 removed. A pair of modules 230 with attachment holders 150 are connected in the center of the belt 300. Standard modules 23 are disposed at the side edges 303, 306 of the belt.

Figure 8A:
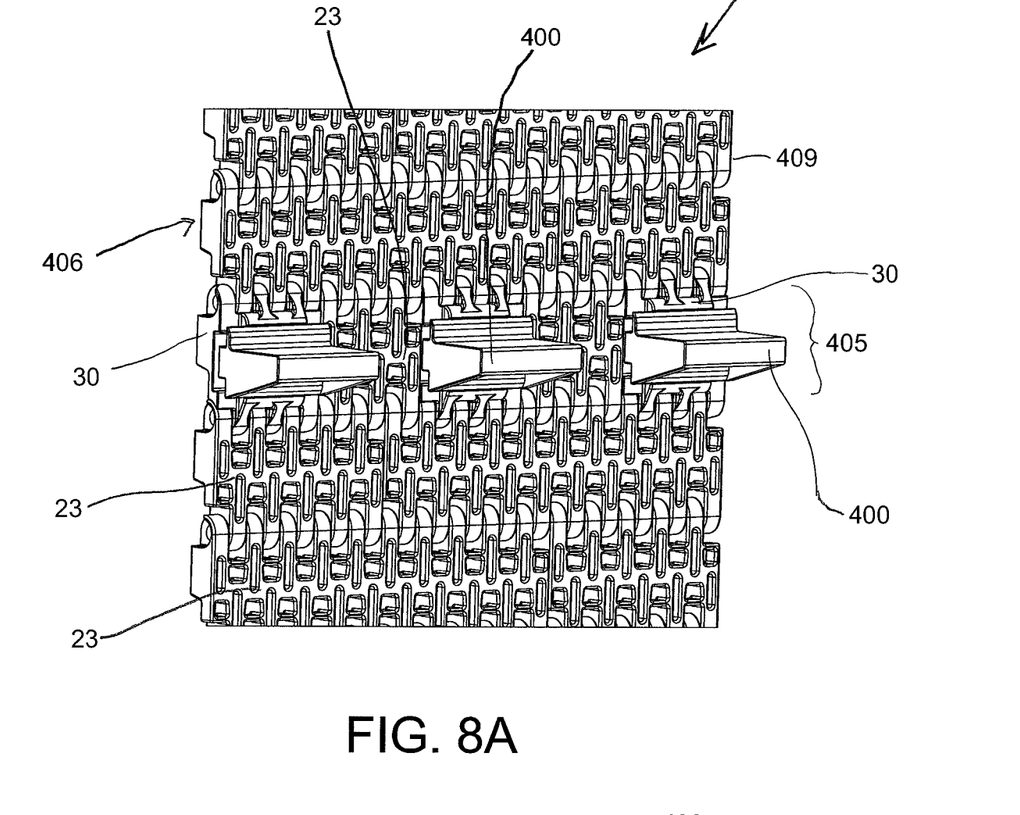
FIG. 8A is an enlarged perspective view of the alternate embodiment of the flight attachment attached to a module with an attachment holder; and, FIG. 8B is a perspective view of the alternate embodiment of the flight attachment.
Figure 8B:
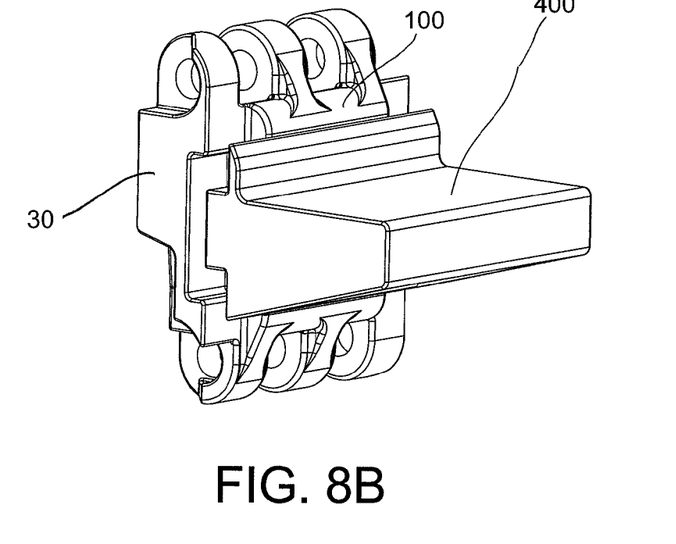

Turning to FIGS. 8A and 8B, an alternate embodiment of the invention with a shorter attachment 400 is shown. The belt 403 has side edges 406 and 409. The shorter attachments 400 can be connected to attachment holders 100 on individual modules 30. The individual modules 30 can be alternated with normal modules 23 within the same row 405 as shown.

The present invention provides many advantages including flexibility in applications where side clearance is limited. The side movement needed for each flight corresponds to the foot width b and can be designed to be very short (i.e. 30 mm).

The present invention also provides for using modules 30 with single attachment holders 100 assembled in a row side-by-side. The number of attachment holders 100 depends on the length of the attachments. The splitting of the attachment holder into short sections has particular advantages: short modules are more flexible and versatile because they can be used for different attachment lengths; if a predetermined fixing strength is desired in order to allow the attachment to disengage at a certain load without damaging the belt it is possible to reduce the number of attachment holders; and, short modules may be combined with normal modules in between and at the belt edges.

In order to provide attachments that release without belt damage, the attachment holders may be designed to hold the attachments up to a certain force limit such that if the limit is exceeded, the holder will flexibly open to release the flight without damage. This fail safe design feature may be accomplished in various ways. The dovetail section may be formed from material that is flexible enough to release the attachment. Other devices such as springs or the like could also be used. Once the remaining broken part is removed it can be replaced by a new flight attachment. Another possibility is to dimension the upstanding wall of the flight attachment such that it will break near the attachment holder at a predetermined load.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A module for holding an attachment, the module comprising:
    an intermediate portion having a first side edge and a second side edge, the intermediate portion having an upper surface with at least one pair of opposed dovetail sections extending above at least a portion of the upper surface, the dovetail sections disposed in spaced apart relation to at least one of the side edges;
    a rib portion disposed on the upper surface of the intermediate portion;
    a first plurality of link ends extending outwardly from the intermediate portion and having openings transverse to the direction of belt travel; and,
    a second plurality of link ends extending outwardly from the intermediate portion in a direction opposite to the first plurality of link ends, the second plurality of link ends being offset from the first plurality of link ends and having openings transverse to the direction of belt travel.

2. A module for holding an attachment, the module comprising:
    an intermediate portion having a first side edge and a second side edge, the intermediate portion having an upper surface with two pairs of dovetail sections separated by a space in a midportion of the module and extending above at least a portion of the upper surface, the dovetail sections disposed in spaced apart relation to at least one of the side edges;
    a first plurality of link ends extending outwardly from the intermediate portion and having openings transverse to the direction of belt travel; and
    a second plurality of link ends extending outwardly from the intermediate portion in a direction opposite to the first plurality of link ends, the second plurality of link ends being offset from the first plurality of link ends and having openings transverse to the direction of belt travel.

3. The module of claim 2, wherein the space has a length approximately equal to the length of the dovetail section.

4. The module of claim 1, wherein the dovetail section is flexible such that the attachment is released at a predetermined load.

5. In combination,
    a module having an intermediate portion with a first side edge and a second side edge, the intermediate portion having an upper surface with at least one pair of opposed dovetail sections extending above at least a portion of the upper surface, the dovetail sections disposed in spaced apart relation to at least one of the side edges; a first plurality of link ends extending outwardly from the intermediate portion and having openings transverse to the direction of belt travel; a second plurality of link ends extending outwardly from the intermediate portion in a direction opposite to the first plurality of link ends, the second plurality of link ends being offset from the first plurality of link ends and having openings transverse to the direction of belt travel, the module having a rib portion on the upper surface; and,
    an attachment having an elongated portion extending from a bottom surface, at least one foot portion extending from the elongated portion and having a width greater than the width of the elongated portion, the foot portion having a locking member with a cantilevered portion with a latch portion at a distal end, the locking member capable of engaging with the rib portion to lock the attachment to the module.

6. The module of claim 5, wherein the at least one pair of dovetail sections comprises two pairs of dovetail sections, the two pairs separated by a space in a midportion of the module.

7. The module of claim 6, wherein the space has a length approximately equal to the length of dovetail section.

8. The module of claim 5, wherein the dovetail section is flexible such that the attachment is released at a predetermined load.

9. A belt capable of articulating about a sprocket in a direction of belt travel, the belt comprising;
    a plurality of first belt modules having an intermediate portion and having a plurality of first link ends extending outwardly from the intermediate portion in the direction of belt travel and having a plurality of second link ends extending outwardly from the intermediate portion in the opposite direction, the first and second link ends being offset and having openings transverse to the direction of belt travel defined therein;
    a plurality of second belt modules, the second belt modules having an intermediate portion with a first side edge and a second side edge, the intermediate portion having an upper surface with at least one pair of opposed dovetail sections extending above at least a portion of the upper surface, the dovetail sections disposed in spaced apart relation to at least one of the side edges; a first plurality of link ends extending outwardly from the intermediate portion and having openings transverse to the direction of belt travel; a second plurality of link ends extending outwardly from the intermediate portion in a direction opposite to the first plurality of link ends, the second plurality of link ends being offset from the first plurality of link ends and having openings transverse to the direction of belt travel, the second belt modules having a rib portion disposed on the upper surface;

a pivot rod extending transverse to the direction of belt travel through the aligned transverse openings of the intercalated link ends of adjacent modules to form rows of pivotally attached modules extending from a first side edge to a second side edge of the belt; and, an attachment having an elongated portion extending from a bottom surface, at least one foot portion extending from the elongated portion and having a width greater than the width of the elongated portion, the foot portion having a locking member with a cantilevered portion with a latch portion at a distal end, the locking member capable of engaging with the rib portion to lock the attachment to the module.

10. The belt of claim 9, wherein at least one row of modules in the belt comprises only second modules.

11. The belt of claim 9, wherein at least one row comprises first and second modules.

12. The belt of claim 9, wherein the first belt modules are disposed at first and second side edges of the belt.

13. The belt of claim 9, wherein the second modules have two or more pairs of dovetail sections per module.

14. The belt of claim 9, wherein the at least one pair of dovetail sections comprises two pairs of dovetail sections, the two pairs separated by a space in a midportion of the module.

15. The belt of claim 14, wherein the space has a length approximately equal to the length of dovetail section.

16. The belt of claim 9, wherein the dovetail section is flexible such that the attachment is released at a predetermined load.

17. The belt of claim 9, wherein the first belt module is a flush grid.

18. The belt of claim 9, wherein the attachment is a flight having a straight upstanding wall.

19. The belt of claim 9, wherein the attachment is a flight having a corrugated wall.

* * * * *